United States Patent
Song et al.

(10) Patent No.: US 12,032,437 B2
(45) Date of Patent: Jul. 9, 2024

(54) REAL-TIME SENSE DATA QUERYING

(71) Applicant: Dell Products L.P., Round Rock, TX (US)

(72) Inventors: Mike Xizhan Song, Westborough, MA (US); Wayne E. Garrett, Jr., Bellingham, MA (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 17/858,575

(22) Filed: Jul. 6, 2022

(65) Prior Publication Data

US 2024/0012708 A1    Jan. 11, 2024

(51) Int. Cl.
*G06F 11/00* (2006.01)
*G06F 11/07* (2006.01)
*G06F 16/2455* (2019.01)

(52) U.S. Cl.
CPC ...... *G06F 11/0793* (2013.01); *G06F 11/0727* (2013.01); *G06F 16/24558* (2019.01)

(58) Field of Classification Search
CPC .......................... G06F 11/0727; G06F 11/0793
See application file for complete search history.

(56) References Cited

U.S. PATENT DOCUMENTS

| | | | | |
|---|---|---|---|---|
| 5,307,491 A | * | 4/1994 | Feriozi | G06F 13/102 719/326 |
| 5,450,579 A | * | 9/1995 | Johnson | G06F 11/0745 719/321 |
| 5,499,378 A | * | 3/1996 | McNeill, Jr. | G06F 13/385 703/24 |
| 5,742,792 A | | 4/1998 | Yanai et al. | |
| 5,867,686 A | * | 2/1999 | Conner | G06F 13/1652 710/200 |
| 5,889,935 A | | 3/1999 | Ofek et al. | |
| 6,052,795 A | * | 4/2000 | Murotani | G06F 11/1466 714/3 |
| 6,052,797 A | | 4/2000 | Ofek et al. | |
| 7,668,981 B1 | * | 2/2010 | Nagineni | H04L 43/16 710/36 |
| 8,904,050 B1 | * | 12/2014 | Raizen | G06F 3/0605 710/10 |
| 9,552,242 B1 | * | 1/2017 | Leshinsky | G06F 11/1471 |
| 11,199,968 B2 | | 12/2021 | Dalmatov | |
| 11,422,718 B1 | | 8/2022 | Chauhan et al. | |

(Continued)

*Primary Examiner* — Joshua P Lottich
(74) *Attorney, Agent, or Firm* — BainwoodHuang

(57) ABSTRACT

A technique is directed to handling a storage device error within storage equipment that includes a client and a driver. The technique involves providing an IO status communication from the driver to the client. The IO status communication indicates status of an IO operation performed by a storage device coupled with the driver. The technique further involves, in response to the IO status communication indicating that an error occurred while the storage device performed the IO operation, providing a query communication from the client to the driver. The query communication requests sense data corresponding to the IO operation. The technique further involves, in response to the query communication, providing the sense data corresponding to the IO operation from the driver to the client.

20 Claims, 7 Drawing Sheets

(56) References Cited

U.S. PATENT DOCUMENTS

| | | | | |
|---|---|---|---|---|
| 2004/0078707 A1* | 4/2004 | Apperley | ............ | G06F 11/0727 |
| | | | | 714/E11.023 |
| 2004/0153833 A1* | 8/2004 | Deacon | ............... | G06F 11/0727 |
| | | | | 714/38.14 |
| 2005/0154797 A1* | 7/2005 | Allen | .................. | G06F 11/0727 |
| | | | | 714/48 |
| 2007/0233973 A1* | 10/2007 | Uno | ...................... | G06F 13/409 |
| | | | | 711/154 |
| 2011/0282846 A1* | 11/2011 | Shepard | .............. | G06F 11/3485 |
| | | | | 707/E17.007 |
| 2012/0260138 A1* | 10/2012 | Downing, III | ......... | G11B 20/18 |
| | | | | 714/723 |
| 2016/0210186 A1* | 7/2016 | Sato | ...................... | G06F 11/073 |
| 2016/0239210 A1* | 8/2016 | Patocka | .................. | G06F 3/065 |
| 2018/0088809 A1* | 3/2018 | Liu | ...................... | G06F 11/3041 |
| 2019/0243562 A1* | 8/2019 | Rooney | ................. | G06F 3/0683 |
| 2023/0130911 A1* | 4/2023 | Lee | ..................... | G06F 11/0772 |
| | | | | 711/118 |
| 2023/0205654 A1* | 6/2023 | Cheng | ................. | G06F 11/2007 |
| | | | | 714/43 |

\* cited by examiner

REAL-TIME SENSE DATA QUERYING

BACKGROUND

A conventional data storage system utilizes an input/output (IO) stack that includes upper level components and lower level components. Example upper level components of the IO stack include a file system layer and a block layer. Example lower level components of the IO stack include a Small Computer System Interface (SCSI) layer and a Serial Attached SCSI (SAS) host bus adapter (HBA) driver.

During operation, the upper layer components provide IO requests to the lower layer components which process the IO requests on physical storage drives and return IO responses to the upper layer components. If an error occurs while processing an IO request, the SAS HBA driver may send an extra notification indicating that an error has occurred up the IO stack. An upper level component may then retrieve sense data from the SAS HBA driver in response to the extra notification indicating that the error has occurred.

SUMMARY

It should be understood that there may be deficiencies to the above-described conventional data storage system. Along these lines, when the upper level component receives the extra notification indicating that the error has occurred, the upper level component simply sends a general request for sense data to the SAS HBA driver. In response to the general request for sense data, the SAS HBA driver provides the upper level component with all of the sense data that the SAS HBA driver has available. Unfortunately, the upper level component has no way of knowing which sense data from the SAS HBA driver corresponds to the particular IO request that triggered the error and which sense data from the SAS HBA driver corresponds to other IO requests that resulted in no errors.

In contrast to the above-described conventional data storage system, improved techniques are directed to real-time sense data querying that provides components of an IO stack with the ability to associate particular sense data with particular IO requests that produced (e.g., caused or triggered) the particular sense data. For example, a client may send a driver an IO request that causes an error. When the client sends the IO request, the client buffers context for the IO request (e.g., a set of timestamps, a device identifier, an operation type, etc.). If the driver returns an IO response to the client indicating that the IO request produced an error, the client is able to send the driver a sense data query that includes at least a portion of the IO context. In response to the sense data query, the driver returns only particular sense data that satisfies the sense data query. Accordingly, the client is able to retrieve particular sense data that is specific to the IO request which produced the error before the IO completes to a set of upper layers of the IO stack.

One embodiment is directed to a method of handling a storage device error within storage equipment that includes a client and a driver. The method includes providing an IO status communication from the driver to the client. The IO status communication indicates status of an IO operation performed by a storage device coupled with the driver. The method further includes, in response to the IO status communication indicating that an error occurred while the storage device performed the IO operation, providing a query communication from the client to the driver. The query communication requests sense data corresponding to the IO operation. The method further includes, in response to the query communication, providing the sense data corresponding to the IO operation from the driver to the client.

Another embodiment is directed to electronic circuitry which includes memory, and control circuitry coupled with the memory. The memory stores instructions which, when carried out by the control circuitry, cause the control circuitry to perform a method of:

(A) providing an IO status communication from a driver to a client, the IO status communication indicating status of an IO operation performed by a storage device coupled with the driver, (B) in response to the IO status communication indicating that an error occurred while the storage device performed the IO operation, providing a query communication from the client to the driver, the query communication requesting sense data corresponding to the IO operation, and (C) in response to the query communication, providing the sense data corresponding to the IO operation from the driver to the client.

Yet another embodiment is directed to a computer program product having a non-transitory computer readable medium which stores a set of instructions to handle a storage device error. The set of instructions, when carried out by computerized circuitry, causes the computerized circuitry to perform a method of:

(A) providing an IO status communication from a driver to a client, the IO status communication indicating status of an IO operation performed by a storage device coupled with the driver;

(B) in response to the IO status communication indicating that an error occurred while the storage device performed the IO operation, providing a query communication from the client to the driver, the query communication requesting sense data corresponding to the IO operation; and (C) in response to the query communication, providing the sense data corresponding to the IO operation from the driver to the client.

In some arrangements, the IO status communication is a SCSI response, and the driver is a SAS driver that supports operation of a plurality of storage devices. Additionally, the method further includes, prior to providing the IO status communication from the driver to the client, conveying a SCSI command from the client to the SAS driver to initiate the IO operation.

In some arrangements, the client is constructed and arranged to (i) refrain from sending query communications to the SAS driver in response to SCSI responses indicating successful IO operations and (ii) send query communications to the SAS driver in response to SCSI responses indicating unsuccessful IO operations. Additionally, providing the IO status communication from the driver to the client includes receiving, by the client, a SCSI status code indicating that the IO operation was unsuccessful.

In some arrangements, the providing the query communication from the client to the driver includes sending, by the client, a real-time sense data request to the SAS driver in response to receiving the SCSI status code indicating that the IO operation was unsuccessful.

In some arrangements, the client is constructed and arranged to buffer an IO context for the SCSI command when the SCSI command is conveyed from the client to the SAS driver to initiate the IO operation. Additionally, providing the query communication from the client to the driver includes sending, by the client, matching criteria to the SAS driver, the matching criteria including at least a portion of the IO context for the SCSI command.

In some arrangements, sending the matching criteria to the SAS driver includes sending, by the client, a set of timestamps and a storage device identifier that uniquely identifies the storage device among the plurality of storage devices to the SAS driver.

In some arrangements, the driver is constructed and arranged to maintain a database of entries which store sense data for respective IO operations performed by a plurality of storage devices supported by the driver. Additionally, providing the sense data corresponding to the IO operation includes:
 (i) based on the query communication, identifying a set of entries that corresponds to the IO operation, and
 (ii) providing sense data from the identified set of entries that corresponds to the IO operation to the client.

In some arrangements, the database of entries resides within a ring buffer. Additionally, the method further includes, in response to the respective IO operations performed by the plurality of storage devices supported by the driver, overwriting older entries within the ring buffer and updating the database of entries to support binary searching.

In some arrangements, identifying the set of entries that corresponds to the IO operation includes applying a binary search algorithm to the database of entries to identify the set of entries based on a time range from the query communication.

In some arrangements, the driver is constructed and arranged to provide a sense data service to the client, the sense data service being in accordance with either (i) an event notification mode in which the driver sends event notifications to the client and does not respond to client query requests from the client and (ii) a query mode in which the driver responds to client query requests from the client and does not send event notifications to the client. Additionally, the method further includes registering the client with the driver such that the driver operates in one of the event notification mode and the query mode.

In some arrangements, registering the client with the driver includes, prior to providing the IO status communication from the driver to the client, performing a registration operation at the driver in response to a registration command from the client, the registration operation configuring the driver to operate in the query mode rather than the event notification mode.

In some arrangements, the method further includes, after providing the sense data corresponding to the IO operation from the driver to the client, performing a re-registration operation at the driver in response to a re-registration command from the client, the re-registration operation re-configuring the driver to operate in the event notification mode rather than the query mode.

It should be understood that, in the cloud context, certain circuitry may be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in real-time sense data querying. Certain embodiments are directed to various methods, electronic components and circuitry which are involved in real-time sense data querying.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to real-time sense data querying that provides components of an IO stack with the ability to associate particular sense data with a particular IO request that produced (e.g., caused or triggered) the particular sense data. For example, a client may send an IO request to a driver that results in an error. When the client sends the IO request, the client buffers context for the IO request (e.g., a set of timestamps, a device identifier, an operation type, etc.). If the driver returns an IO response to the client indicating that the IO request produced an error, the client is able to send the driver a sense data query that includes at least a portion of the IO context. In response to the sense data query, the driver returns only particular sense data that satisfies the sense data query. Thus, the client is able to obtain particular sense data that is specific to the IO request which produced the error before the IO completes to a set of upper layers of the IO stack.

It should be appreciated that the client may send the sense data query to the driver in response to the IO response (e.g., in direct response to SCSI status resulting from a SCSI command provided earlier by the client) thus enabling the client to identify a precise time range to the driver. Accordingly, the driver may return only sense data for that precise time range in real-time before the IO completes to a set of upper layers of the IO stack. As a result, there is real-time servicing of the sense data query.

In contrast, the earlier-described conventional sense data delivery approach involves an upper level component of the IO stack sending a general request for any/all sense data that the SAS HBA driver has in response to the upper level component receiving an extra notification which is out of band from IO responses (e.g., an error notification that is different from SCSI status). Accordingly, there is no direct association between the extra notification and any IO operation. As a result, there is no correspondence established between IO operations and sense data in the conventional approach.

Figure 1:
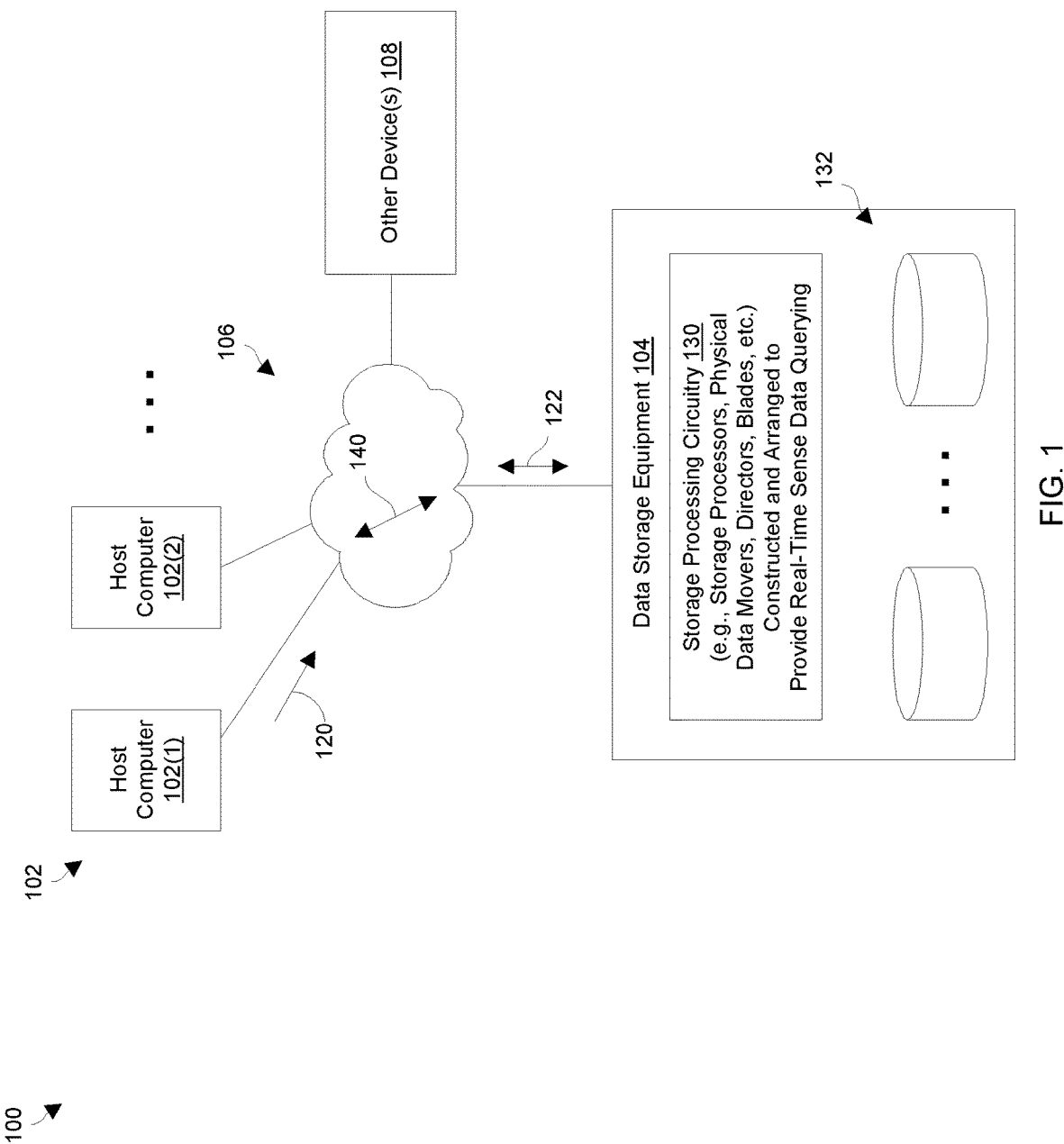
FIG. 1 is a block diagram of a storage system setting which provides real-time sense data querying in accordance with certain embodiments.

FIG. 1 shows a storage system setting 100 which provides real-time sense data querying in accordance with certain embodiments. The storage system setting 100 includes host computers 102(1), 102(2), . . . (collectively, host computers 102), data storage equipment 104, a communications medium 106, and perhaps other devices 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to richly and reliably store host data 122 within and retrieve host data 122 from storage (e.g., primary storage or main memory, secondary storage, tiered storage, combinations thereof, etc.).

The data storage equipment 104 (e.g., a storage array, a storage system, etc.) includes storage processing circuitry 130 and storage devices 132. The storage processing circuitry 130 is constructed and arranged to respond to the host I/O requests 120 from the host computers 102 by writing data into the storage devices 132 and reading the data from the storage devices 132.

The storage processing circuitry 130 may include one or more physical storage processors (SPs) or engines, data movers, director boards, blades, I/O modules, storage device controllers, switches, other hardware, combinations thereof, and so on. The storage devices 132 provide persistent/non-volatile storage in accordance with one or more RAID data protection schemes and may include one or more types of storage drives, e.g., non-volatile random access memory (NVRAM) devices, solid state drives (SSDs), hard disk drives (HDDs), combinations thereof, and so on.

In accordance with certain embodiments, at least some of the storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 processes the host I/O requests 120 through an IO stack to perform load and store operations. Along these lines, upper level layers of the IO stack send I/O requests (or instructions) down to lower level layers of the IO stack to write data into and/or read data from the storage devices 132.

If an error occurs, various layers of the IO stack are able to coordinate access to sense data associated with the error. In particular, such coordination provides for real-time sense data querying to enable retrieval of sense data specific to the error and thus more effective error handling and/or assessment. Further details will now be provided with reference to FIG. 2.

Figure 2:
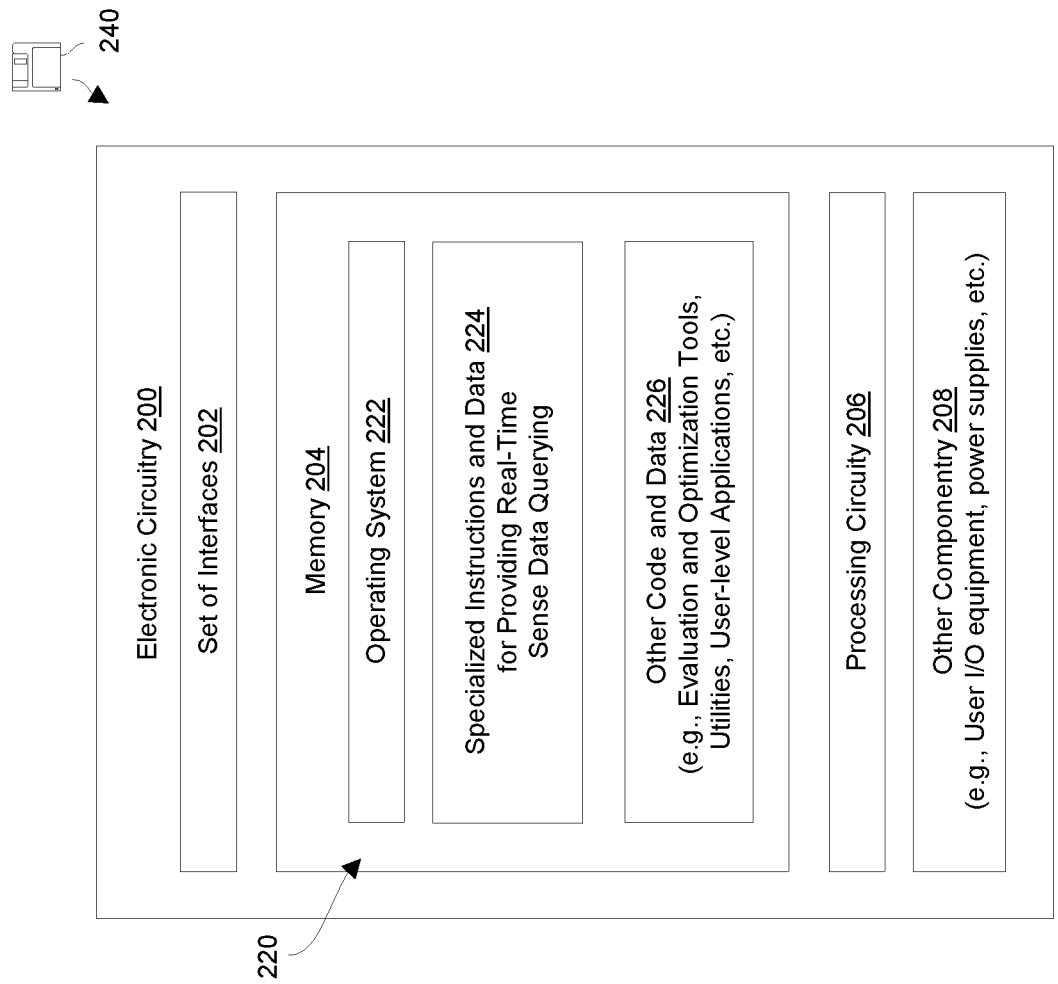
FIG. 2 is a block diagram of electronic equipment for the storage system setting in accordance with certain embodiments.

FIG. 2 is a block diagram of electronic circuitry 200 which is suitable for at least a portion of the data storage equipment 104 (also see FIG. 1) in accordance with certain embodiments. The electronic circuitry 200 includes a set of interfaces 202, memory 204, processing circuitry 206, and other circuitry 208.

The set of interfaces 202 is constructed and arranged to connect the electronic circuitry 200 to the communications medium 106 (FIG. 1) to enable communications with other devices of the storage system setting 100 (e.g., the host computers 102). Such communications may be IP-based, SAN-based, cellular-based, cable-based, fiber-optic based, wireless, cloud-based, combinations thereof, and so on. Additionally, the set of interfaces 202 is constructed and arranged to connect the electronic circuitry 200 other local equipment such as the set of storage devices 132. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, and other code and data 226. The operating system 222 refers to particular control code such as a kernel to manage computerized resources (e.g., processor cycles, memory space, etc.), the I/O stack (e.g., drivers), and so on. The specialized instructions and data 224 refers to particular instructions for providing real-time sense data querying. In some arrangements, the specialized instructions and data 224 is tightly integrated with or part of the operating system 222 itself. The other code and data 226 refers to applications and routines to provide additional operations and services (e.g., performance measurement tools, etc.), user-level applications, administrative tools, utilities, and so on.

The processing circuitry 206 is constructed and arranged to operate in accordance with the various software constructs 220 stored in the memory 204. As will be explained in further detail shortly, the processing circuitry 206 executes the operating system 222 and the specialized code 224 to form specialized circuitry that robustly and reliably manages host data on behalf of a set of hosts. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include special user I/O equipment (e.g., a service processor), buses, cabling, adaptors, auxiliary apparatuses, other specialized data storage componentry, etc. Further details will now be provided with reference to FIG. 3.

Figure 3:
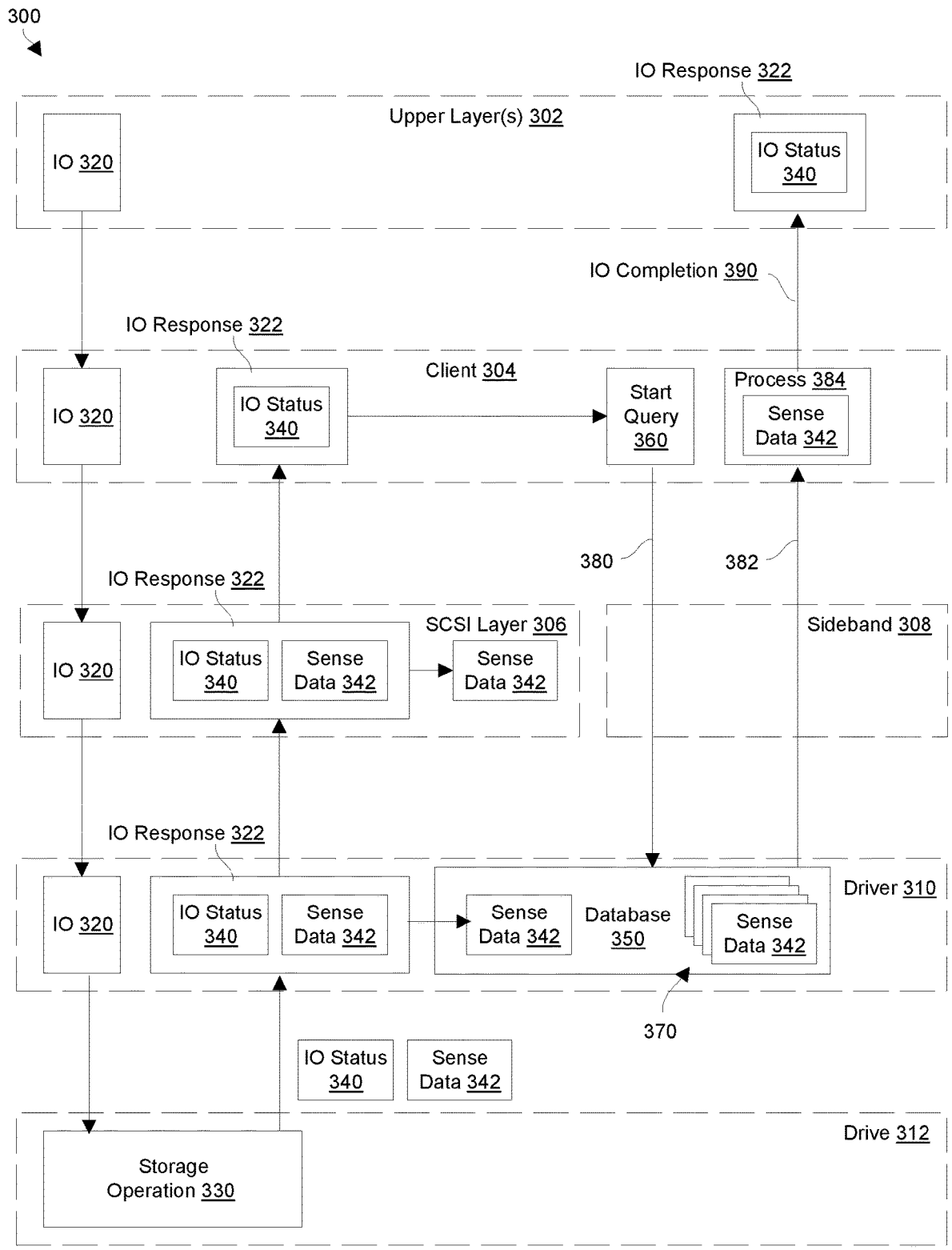
FIG. 3 is a block diagram illustrating details of real-time sense data querying in accordance with certain embodiments.

FIG. 3 shows certain details for real-time sense data querying in accordance with certain embodiments. As shown, a portion of an IO stack 300 of the data storage equipment 104 includes a set of upper layers 302, a client 304, a SCSI layer 306, a sideband layer 308, a driver 310, and a physical drive 312 (also see FIG. 1). Such IO stack components may be formed by hardware and/or software (e.g., specialized circuitry) that processes I/O requests 120 from hosts. One or more parts of the IO stack 300 may reside in a storage processor, a host bus adaptor, a storage device, other componentry, combinations thereof, etc.

The set of upper layers 302 is constructed and arranged to perform various higher level operations. Examples of such higher level operations include caching, replication, deduplication, compression/decompression, mapping, RAID-level protection operations, and so on.

The client 304 is disposed between the set of upper layers 302 (above) and the SCSI layer 306 and the sideband layer 308 (below). The client 304 is constructed and arranged to oversee IO handling by the lower layers of the IO stack 300. Along these lines, the client 304 may provide configuration input, registration data, instructions, etc. to the lower layers, as well as control real-time sense data querying in response to errors.

The SCSI layer 306 is disposed between the client 304 and the driver 310. The SCSI layer 310 is constructed and arranged to process SCSI commands (e.g., SCSI write commands, SCSI read commands, SCSI inquiry commands, etc.) and return SCSI responses.

The sideband layer 308 is also disposed between the client 304 and the driver 310. The sideband layer 308 represents communications pathways (or conduits) between the client 304 and the driver 310 that are different from the standard SCSI pathway for IOs (e.g., via a different API).

The driver 310 is disposed between the SCSI layer 306 and the sideband layer 308 (above) and the drive 312 (below). The driver 310 is constructed and arranged to serve as a SCSI interface to the drive 312 (i.e., a SCSI driver).

The drive 312 is disposed at the bottom of the IO stack 300, and includes memory (e.g., magnetic memory, flash memory, combinations thereof, etc.) for storing data. The drive 312 is constructed and arranged to process IOs, i.e., data storing and data loading operations. In some arrangements, the drive 312 is a Serial Attached SCSI drive, and the driver 310 that communicates with the drive 312 is a SAS driver.

During operation, the IO stack 300 processes IOs 320 in the downward direction (i.e., from the set of upper layers 302 to the drive 312). Additionally, the IO stack 300 returns IO responses 322 in the upward direction (i.e., from the drive 312 to the set of upper layers 302).

Along these lines, an IO 320 is shown in FIG. 3 as being sent from the set of upper layers 302 to the drive 312. As the IO 320 proceeds in the downward direction, the IO stack 300 performs a variety of operations. For example, as the IO 320 moves down the IO stack 300, the client 304 stores the context of the IO 320 such as a timestamp for a start time when the client 304 sends the IO 320 to the SCSI layer 306, a device identifier which uniquely identifies the drive 312 to which the IO 320 is sent among other drives 312, an opcode for the operation, and so on. As yet another example, in response to receipt of the IO 320, the driver 310 directs the drive 312 to perform a storage operation 330 such as writing data to memory or reading data from memory.

In response to storage operation 330 performed by the drive 312, the drive 312 outputs IO status 340 and sense data 342 to the driver 310. The IO status 340 indicates whether the storage operation 330 completed successfully. Additionally, the sense data 342 includes various details regarding the storage operation 330 (e.g., operation type, memory location, etc.).

When the driver 310 receives the IO status 340 and the sense data 342 resulting from the storage operation 330, the driver 310 packages the IO status 340 and the sense data 342 into an IO response 322, and passes the IO response 322 up the IO stack 300 to the SCSI layer 306. Additionally, the driver 310 buffers a copy of the sense data 342 within a sense data database 350.

The sense data database 350 includes multiple sense data entries 370 holding sense data 342 from the various IOs 320 handled by the driver 310. In accordance with certain embodiments, sense data database 350 may be in the form a ring buffer in which the oldest entries 370 are overwritten with new entries 370 once the ring buffer is filled. In some arrangements, the driver 312 maps the sense data entries 370 of the database 350 into a binary tree for fast and accurate searching.

The SCSI layer 306 receives the IO response 322 from the driver 310 and removes the sense data 342 before sending the IO response 322 further up the IO stack 300 to the client 304.

Upon receipt of the IO response 322 from the SCSI layer 306, the client 304 determines whether the IO operation 330 completed successfully based on the IO status 340 within the IO response 322 (e.g., by evaluating a SCSI status code). If the client 304 determines that the IO operation 330 did not complete successfully, the client 304 generates a real-time sense data query 360 and sends the real-time sense data query 360 to the driver 310 (arrow 380). The real-time sense data query 360 includes a portion of the context of the original IO 320 such as the timestamp for the start time when the client 304 sent the IO 320 to the SCSI layer 306, a drive identifier that uniquely identifies the drive 312 among other drives 312, one or more portions of the SCSI command descriptor block (CDB), etc.

In response to the real-time sense data query 360 from the client 304, the driver 310 performs a search of sense data entries within the database 350 and returns only the sense data 342 that satisfies the real-time sense data query 360

(arrow 382). That is, the driver 310 does not return other sense data 342 that does not satisfy the query 360.

Accordingly, the client 342 is able to receive the precise sense data 342 corresponding to the original IO 320 and process that sense data 342 in real-time (see the box 384) before IO completion 390 (i.e., before the set of upper layers 302 receives the IO response 322). That is, the IO completion 390 occurs after sense data processing 384. Moreover, the client 342 is able to retrieve the precise sense data 342 without ambiguity thus enabling effective processing 384 of the sense data 342 that caused an error such as identifying problematic sections on the drive 310, a particular operation affecting drive health, etc.

It should be understood that the real-time sense data query 360 and the provided sense data 342 were communicated via a sideband layer 308 that is different from the SCSI layer 306. Accordingly, the sideband layer 308 may be viewed as a service that is separate from SCSI command processing by the SCSI layer 306. Further details will now be provided with reference to FIG. 4.

Figure 4:
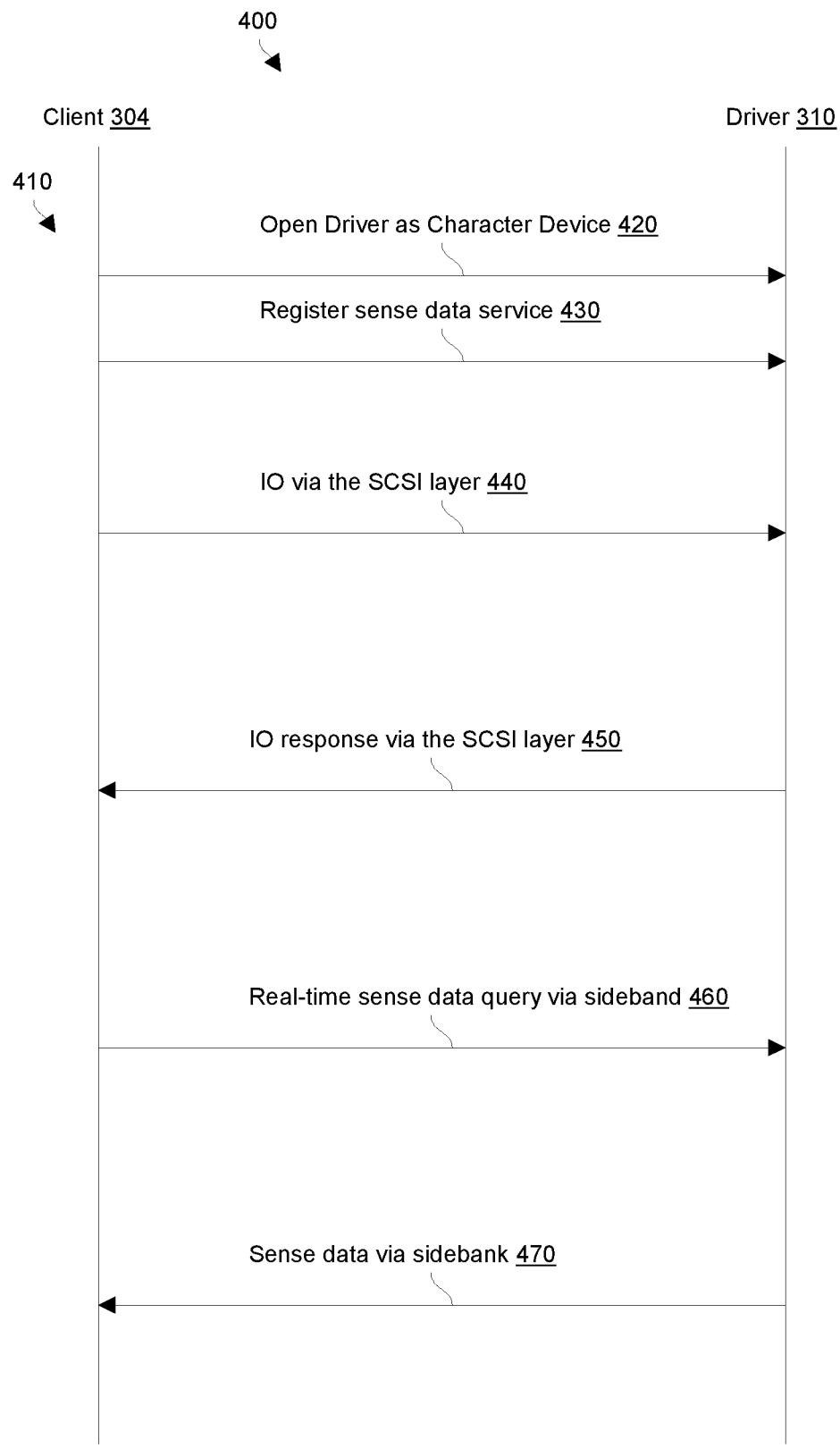
FIG. 4 is a sequence diagram illustrating details of real-time sense data querying in accordance with certain embodiments.

FIG. 4 is a sequence diagram 400 illustrating certain exchanges (e.g., communications) 410 between the client 304 and the driver 310 in accordance with certain embodiments (also see FIG. 3). Some exchanges 410 occur through the SCSI layer 306 while other exchanges are out of band from the SCSI layer 306, e.g., see the sideband layer 308 in FIG. 3.

Initially, the client 304 performs certain configuration operations on the driver 310. For example, at arrow 420, the client 304 opens the driver 310 as a character device to enable the driver 310 to communicate with the client 304 via characters (e.g., bytes, octets, etc.).

After the client 304 opens the driver 310 as a character device and as shown by arrow 430, the client 304 registers with the driver 310. That is, the driver 310 may be able to responds to more than one client 304, so such registration informs the driver 310 of a client identifier that uniquely identifies the client 304 among other clients 304.

Additionally, the driver 310 may be equipped to provide different services (e.g., notification for different events) and registration directs the driver 310 to provide certain types of notifications back to the client 304.

For example, suppose that the driver 310 is preconfigured with the following:
define SERVICE_TYPE_QUERY_ONLY 0x01
define SERVICE_TYPE_EVENT_NOTIFICATION 0x00

Then, the client 304 may set a service_type parameter of the driver 310 to configure the driver 310 to provide a real-time sense data querying service to the client 304. For example, the setting:
service_type=SERVICE_TYPE_QUERY_ONLY
directs the driver 310 to respond to sense data queries from the client 304 rather than provide a more routine event notification to the client 304 when the driver 310 encounters an error with the drive 312. Alternatively, the setting:
service_type=SERVICE_TYPE_EVENT_NOTIFICATION
directs the driver 310 to provide a more routine event notification to the client 304 when the driver 310 encounters an error with the drive 312 rather than respond to sense data queries from the client 304.

Suppose that the client 304 has configured the driver 310 to response to sense data queries. For example, the configuration instructions may be among a set of instructions that the client 304 initially sends to the driver 310 to configure the driver 310 for operation:

ioctl=OSW_IOCTL_SENSE_BUF_REQUEST
request_type=SENSE_DATA_REQ_REGISTER_CLIENT
service_type=SERVICE_TYPE_QUERY_ONLY
client_name="QRY"

The parameter client_name uniquely identifies the client 304 to the driver 310 among other clients 304 that can communicate with the driver 310.

At this point, the driver 310 is ready to process IOs 320 from the client 304, and return IO responses 322 (also see FIG. 3). An IO response 322 may indicate that a drive 312 has completed a respective IO 320 successfully. However, an IO response 322 may alternatively indicate that a drive 312 has completed a respective IO 320 unsuccessfully.

It should be understood that, when the client 304 receives an IO 322 from a upper layer 302 and conveys that IO 322 to the SCSI layer 306, the client 304 saves the context of the IO 320 and a timestamp. For example, the client 304 may save the following information for the IO 322:
SAS address
SCSI CDB opcode
CDB length
start time (i.e., when the client sends the IO to the driver)
end time (i.e., when the client receives the IO response from the driver)

Then, as shown by the arrow 440, the client 304 sends the particular IO 320 to the driver 310. The particular IO 320 may be a write command to write data to a drive 312, or a read command to read data from the drive 312.

When the driver 310 receives the IO 322, the driver 310 sends that IO 322 to the drive 312, receives an IO completion indication which includes IO status 340 and particular sense data 342 from the drive 312, records a timestamp of the particular sense data 342, and stores the particular sense data 342 in an entry 370 of the database 350 which may be indexed by the timestamp (also see FIG. 3). The driver 310 then sends an IO response 322 containing the IO status 340 and the particular sense data 342 to the SCSI layer 306 which removes the particular sense data 342 before providing the IO response 322 to the client 304.

Suppose that the particular IO 320 results in unsuccessful completion (i.e., an error). In this situation and at arrow 450, the driver 310 sends an IO response 322 with IO status 340 indicating unsuccessful completion of the IO 320.

The client 304 receives the IO response 322 and records a timestamp for an end time of the IO 320. Accordingly, the client 304 now has the timestamps for the start time and the end time to define a narrow (or tight) time period of the IO 320.

Additionally, the client 304 detects the indication of the unsuccessful completion of the IO 320 within the IO response 322 (e.g., via evaluating the IO status 340). In response to such detection, the client 304 generates and sends a real-time sense data query to the driver 312. The real-time sense data query is illustrated as the box 360 in FIG. 3 and the arrow 460 in FIG. 4. The real-time sense data query includes matching criteria such as the timestamps indicating the start and end times for the IO 320, the drive identifier, and the SCSI opcode used in the operation. Other criteria are also suitable for inclusion such as the Command Descriptor Block (CDB) length, and/or certain contents/aspects of the CDB.

When the driver 312 receives the real-time sense data query, the driver 312 performs a search of the sense data database 350 (also see FIG. 3) and returns, as arrow 470 in FIG. 4, sense data from any sense data entries within the database 350 matching the criteria. In some arrangements, the driver 312 adds that sense data to a response buffer (e.g., also see the sideband 308 in FIG. 3).

When the client 304 receives the sense data results of the search, the client 304 only receives sense data pertaining to the particular IO 322. Accordingly, the client 304 is able to process just the sense data that is specific to the IO 320 that triggered the unsuccessful completion, as well as perform other operations such as perform one or more actions on the drive 312. Further details will now be provided with reference to FIG. 5.

Figure 5:
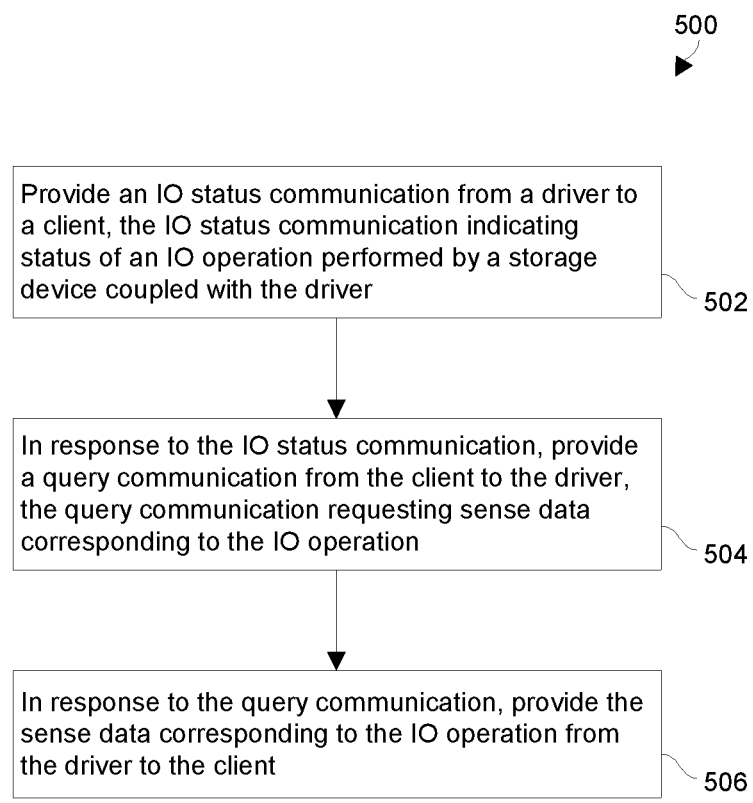
FIG. 5 is a flowchart of a procedure which is performed by specialized equipment in accordance with certain embodiments.

FIG. 5 is a flowchart of a procedure 500 which is performed by specialized equipment in accordance with certain embodiments. The procedure 500 carries out real-time sense data querying.

At 502, an input/output (IO) status communication is provided from the driver to the client. The IO status communication indicates status of an IO operation performed by a storage device coupled with the driver.

At 504, in response to the IO status communication indicating that an error occurred while the storage device performed the IO operation, a query communication is provided from the client to the driver. The query communication requests sense data corresponding to the IO operation.

At 506, in response to the query communication, the sense data corresponding to the IO operation is provided from the driver to the client. Accordingly, the client receives sense data specific to the IO that caused the error. Further details will now be provided with reference to FIG. 6.

Figure 6:
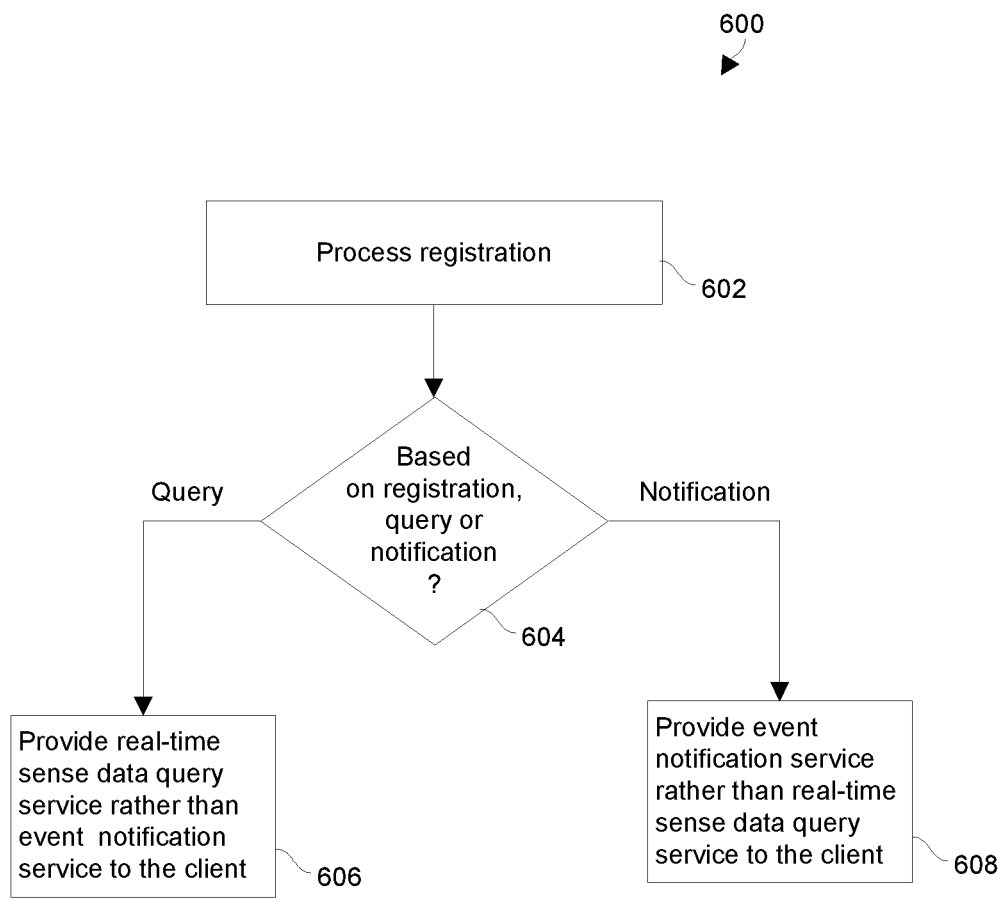
FIG. 6 is a flowchart of another procedure which is performed by specialized equipment in accordance with certain embodiments.

FIG. 6 is a flowchart of a procedure 600 that is performed by the IO stack 300 that enables service selection in accordance with certain embodiments. In accordance with these embodiments, the client 304 and the driver 310 are constructed and arranged to provide both a real-time sense data query service and an event notification service. To this end, the client 304 and the driver 310 support selective operation in either a real-time sense data query mode or an event notification mode. Such identification of a service selection may be performed during registration of the client 304 with the driver 310 prior to IO stack processing of IOs 320 (e.g., see the arrow 430 in FIG. 4).

Figure 7:
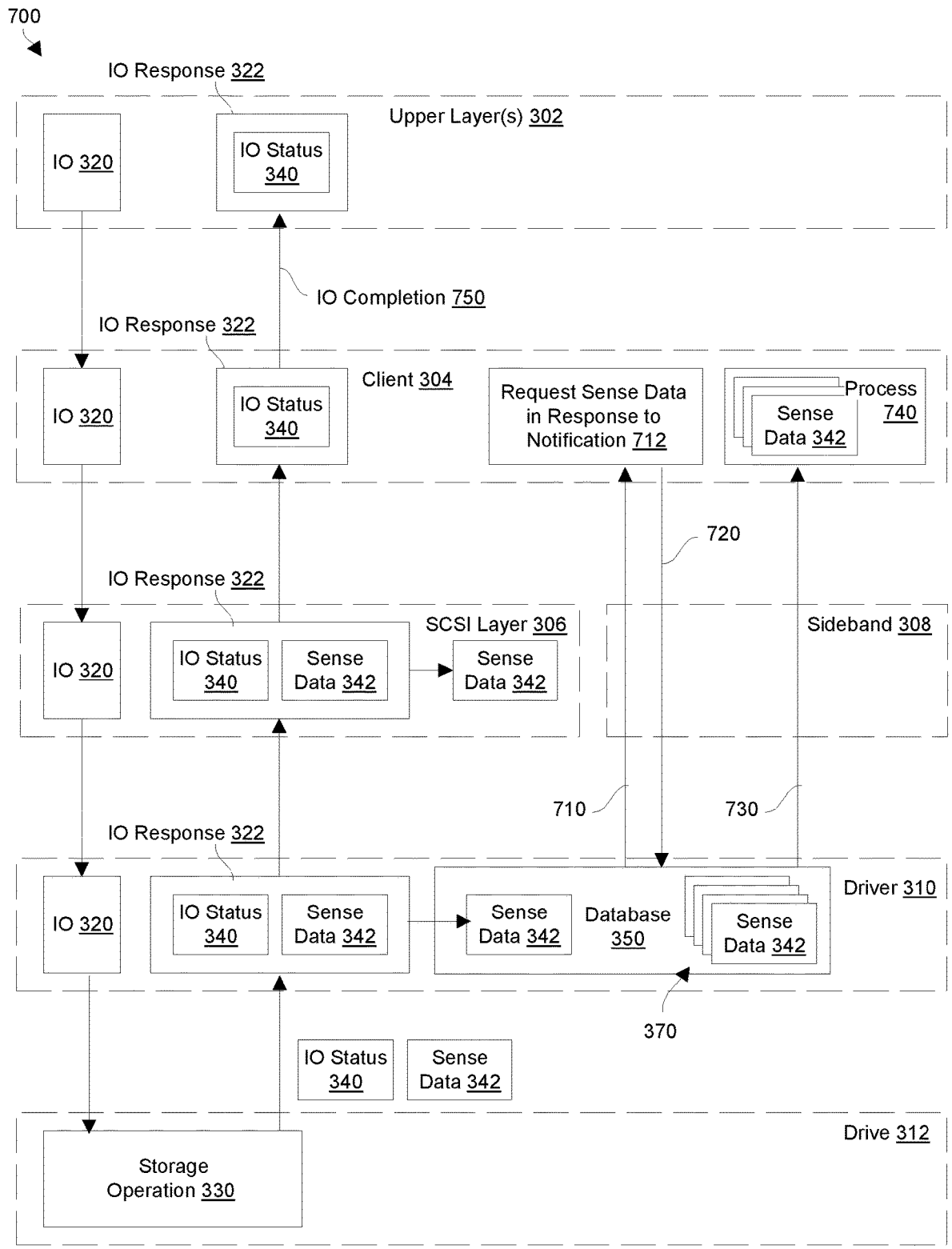
FIG. 7 is a block diagram illustrating further details of real-time sense data querying in accordance with certain embodiments.

At 602, the IO stack 300 processes a client registration. In particular, the client 304 provides a registration command to the driver 310 indicating whether the client 304 and the driver 310 will use real-time sense data querying (also see FIG. 3) or whether the client 304 and the driver 310 will use event notifications (FIG. 7).

At 604, the IO stack 300 determines whether to provide a real-time sense data query service or a notification service. In particular, if the registration command selects the real-time sense data query service, 604 proceeds to 606. However, if the registration command selects the event notification service, 604 proceeds to 608.

At 606, the IO stack 300 provides the real-time sense data query service rather than the notification service. Certain example details of a real-time sense data query service in accordance with certain embodiments were describe above in connection with FIG. 3.

At 608, the IO stack 300 provides the event notification service rather than the real-time sense data query service. Certain example details of an event notification service will now be provided with reference to FIG. 7.

FIG. 7 shows certain event notification service details in accordance with certain embodiments. As shown in FIG. 7 as well as in FIG. 3, the portion of the IO stack 300 includes the set of upper layers 302, the client 304, the SCSI layer 306, the sideband layer 308, the driver 310, and the physical drive 312. Such IO stack components are able to operate to provide a real-time sense data query service as explained earlier in connection with FIG. 3.

However, if the client 304 registers with the driver 310 to receive the event notification service instead of the real-time sense data query service, the client 304 and the driver 310 then operate in the event notification mode. Such a mode is well suited for certain situations such as a situation in which the data storage equipment 104 is provisioned for legacy diagnostics and error handling.

When the IO stack 300 operates in the event notification service mode to process an IO 320, the driver 310 provides an IO response 322 to the client 304 via the SCSI layer 306 in a manner similar to that which was described for the real-time sense data query service mode. In particular, the IO response 322 provided by the driver 310 includes both IO status 340 and sense data 342. Here, the SCSI layer 306 drops the sense data 342 from the IO response 322 and conveys the IO response 322 containing the IO status 340 but not the sense data 342 to the client 304.

Now, suppose that an error occurs while processing the IO 320, the driver 340 further provides an event notification 710 to the client 304 while adding the sense data 342 to the database 350. As shown in FIG. 7, the driver 310 sends the event notification 710 to the client 304 out of band of the SCSI layer 306.

The client 304 receives the event notification 710, performs an operation 712 to generate a sense data request 720, and sends the sense data request 720 to the driver 310. Similarly, the client 304 sends the sense data request 720 to the client 304 out of band of the SCSI layer 306.

When the driver 310 receives the sense data request 720 from the client 304, the driver 304 returns all of the sense data entries 342 that are in the database 350 that correspond to the client 304, as shown by the arrow 730. That is, the sense data request 720 is not a query that causes the driver 310 to perform a search of the database 350 based on context matching criteria. Rather, the sense data request 720 simply asks the driver 310 to provide sense data 342 from all of the entries 370 in the database 350 for the client 304. It should be understood that since the sense data request 720 does not have any context, there is no opportunity for the driver 310 to return only context matching sense data 342. Accordingly, the client 342 is likely to receive sense data 342 of many entries 370 of the database 350 which are then processed 740 (e.g., for error handlings).

Moreover, in the event notification mode illustrated in FIG. 7, IO completion 750 is independent of the communications 710, 720, and 730 between the client 304 and the driver 310. Accordingly, the IO response 322 may reach the set of upper layers 302 while the client 304 and the driver 310 are still communicating regarding the sense data 342, i.e., there is not a real-time aspect to the event notification mode.

As explained above and in accordance with certain embodiments, the IO stack 300 is capable of supporting selection between operating in a real-time sense data query mode and an event notification mode. Such real-time sense data querying enables the data storage equipment 104 to perform analytics on precise sense data 342 associated with a particular IO 320. Such event notification processing enables the data storage equipment 104 to support legacy-style operation.

As described above, improved techniques are directed to real-time sense data querying that provides components of an IO stack 300 with the ability to associate particular sense data 342 with particular IOs 320 that produced (e.g., caused or triggered) the particular sense data 342. For example, a client 304 may send a driver 310 an IO 320 that causes an error. When the client 304 sends the IO 320, the client 304 buffers context for the IO 320 (e.g., a set of timestamps, a device identifier, an operation type, etc.). If the driver 310 returns an IO response 322 to the client 304 indicating that the IO 320 produced an error, the client 304 is able to send the driver 310 a sense data query 360 that includes at least a portion of the IO context. In response to the sense data query 360, the driver 310 returns only particular sense data 342 that satisfies the sense data query 360. Accordingly, the client 304 is able to retrieve particular sense data 342 that is specific to the IO 320 which produced the error.

One should appreciate that the above-described techniques do not merely collect and store data. Rather, the disclosed techniques involve improved error handling. Accordingly, such techniques provide for better data protection, reliability, flexibility, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage system setting 100 such as the host computers 102, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that certain terms such as "device", "SAS device" and "drive" may mean SAS drives in accordance with certain embodiments. Additionally, the term "sense data service" may be a general term which may indicate one or more of the following: "SCSI IO sense data", "drive topology change", "expander topology change" and "non-check-condition IO error status" in accordance with certain embodiments.

In some installations, a SAS HBA driver hosts a database of SCSI IO sense data that is received from the SAS controller. In these installations, certain software components (or clients) can register with the SAS HBA driver to receive sense data services.

In some installations, the clients of SAS sense data services do not require a one-to-one mapping between SCSI IO and the sense data and, the completion of SCSI IO and the receipt of sense data are transferred in different paths and need not to be ordered.

However, in accordance with certain embodiments, a client is able to receive the sense data for a particular IO (or a set of IOs) in real-time in IO path as the IO completes to the client (upper) layer. Such a technique provides the clients with real-time accounting of errors and health conditions of SAS devices. Clients such as a drive improved error handler (DIEH) may use this information to determine if actions need to be taken on a particular device, such as taking the device out of service.

If event notifications are selected, the SAS driver delivers sense data to clients via an event notification mechanism independent of the SCSI IO path. The clients do not require a sense data be associated with its IO and only the IO attributes such as device address, LBA and opcode are required. Also, the clients do not have requirements for the ordering of sense data and the completion of SCSI IO to the clients. Since the sense data delivery path is independent of the IO path, the client may receive IO completion and sense data updates in different sequence/ordering. Each sense data delivery in the IO stack may be measured about 10 microseconds or less. This is usually faster than most IOs but there is no guarantee that the sense data has been received by the client when the IO completes.

If real-time sense data querying is selected, the IO stack enables the client to associate a sense data with a particular IO where the error occurred on, and allows for real-time query of IO sense as the IO completes to the client subsystem. When a client receives an IO to be sent down the IO stack, the client marks the "start time" for the IO and when the IO is completed back to the client, it marks the "end time" for the IO.

In the driver, when sense data is reported on a particular IO, it adds an entry in the sense data database by recording the IO attributes and a time stamp. This timestamp value is in between the "start time" and the "end time" recorded by the client for a particular IO. As the IO is completed to the client with error, if the client wishes to collect potential sense data for this IO, the client sends a query command to the driver by including the IO attributes and the time stamps (start/end).

Upon receiving the sense data query command, the driver searches its sense data database for a possible match by comparing the time stamps and other IO attributes. The results are returned to the client when the call returns. By changing the start and end time, the client has the option to query sense data for multiple IOs.

In accordance with certain embodiments, a client registers with the driver. That is, to be able to receive sense data services, the client registers with SAS driver for a new (query) service type (see below). A successfully registration is required.

In some embodiments, the clients can choose to register either for "event notification service" or for "query service" but not both. The real-time sense data query service is identified by a service type of SERVICE_TYPE_QUERY_ONLY. The event notification service is identified by a service type of SERVICE_TYPE_EVENT_NOTIFICATION.

Each service type registered is associated with a single unique file descriptor of the SAS driver and the clients can register for more than one service types by making multiple open calls to the SAS driver character device and providing a different service type for each registration.

define SERVICE_TYPE_EVENT_NOTIFICATION 0x00
define SERVICE_TYPE_QUERY_ONLY 0x01

As part of sense data registration in certain embodiments, the clients specify the desired data types by providing a data type mask which is a combination of one or more of the following mask types.

define DATA_TYPE_IO_SENSE_DATA 0x01
define DATA_TYPE_DRIVE_TOPOLOGY_CHANGE 0x02 define DATA_TYPE_EXPANDER_TOPOLOGY_
    CHANGE 0x04
define DATA_TYPE_IO_ERROR_STATUS 0x08
Note that for "query" service type, only DATA_TYPE_IO_
SENSE_DATA data mask type can be specified and for "event notification" service type, all data mask types can be specified.

In accordance with certain embodiments, when a client sends a real-time sense data query command to the SAS driver, it provides the following matching criteria. These criteria are compared with entries in the SAS driver sense data database to find matching IOs.
    IO start time
    IO end time
    SAS address
    SCSI IO CDB opcode
    SCSI CDB LBA
    SCSI IO CDB len In accordance with certain embodiments, in the query request, the clients specify a time stamp range (start and end time) as part of the matching criteria. A narrow range is used when sense data for one IO is desired and a wider range is used when sense data for multiple IOs are desired.

The SAS driver uses the time stamp information to execute a binary search algorithm to determine a small range of entries (start index and end index) in the sense data database where the matching entries might be located. So the time stamps are examined before other matching criteria are checked.

Further refined liner search is performed within the start index and the end index by comparing other matching criteria such as SAS address, CDB opcode, CDB length. The search starts from the most recent index in the database. Therefore, the first entry in the sense data list returned to the client is the most recent sense data collected that satisfies the matching criteria.

For the CDB length, a match means that the IO LBA+length in the SAS sense database completely falls within the LBA+length range in the query request specified by the client.

In accordance with certain embodiments, in the query request, the client can set the max number of match entries (request_count) that can be replied in the response. The minimum value is 1 and the maximum value is 100.

In accordance with certain embodiments, for each match entry, SAS driver copies the matched sense data along with the IO attributes (such as SAS address, CDB opcode, LBA, length) to the return buffer. The number of matched entries found is returned to the client in the "reply_count" field of the query response.

If the reply_count reaches the request_count, SAS driver sets the "TSC" field in the response to the time stamp of the next entry in the database. The client has an option to take advantage of this TSC value to guide more efficient further queries. However, client does not have to use it for further queries. The TSC value is set to zero if the reply_count is less than the request_count.

If the request_count is reached before the whole range is searches, the search will end and the matched entries thus far are sent back to the client in the response. In such a situation (which may be rare), the client can issue another query by re-adjusting the time stamps.

A reply_count of zero is returned is no match is found.

In accordance with certain embodiments, the driver maintains a sense data database in a ring buffer which has a size of maximum 20K entries. The buffer will wrap and the earliest entries are overridden when the buffer is full. This large size guarantees a long lifetime of an sense data entry in the sense data database before it is overridden.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. Within storage equipment that includes a client and a driver, a method of handling a storage device error, the method comprising:
    providing an input/output (IO) status communication from the driver to the client, the IO status communication indicating status of an IO operation performed by a storage device coupled with the driver;
    in response to the IO status communication indicating that an error occurred while the storage device performed the IO operation, providing a query communication from the client to the driver, the query communication requesting sense data corresponding to the IO operation; and
    in response to the query communication, providing the sense data corresponding to the IO operation from the driver to the client;
    wherein the IO status communication is a Small Computer System Interface (SCSI) response;
    wherein the driver is a Serial Attached SCSI (SAS) driver that supports operation of a plurality of storage devices; and
    wherein the method further comprises:
        prior to providing the IO status communication from the driver to the client, conveying a SCSI command from the client to the SAS driver to initiate the IO operation.

2. The method of claim 1 wherein the client is constructed and arranged to (i) refrain from sending query communications to the SAS driver in response to SCSI responses indicating successful IO operations and (ii) send query communications to the SAS driver in response to SCSI responses indicating unsuccessful IO operations; and
    wherein providing the IO status communication from the driver to the client includes:
        receiving, by the client, a SCSI status code indicating that the IO operation was unsuccessful.

3. The method of claim 2 wherein providing the query communication from the client to the driver includes:
    sending, by the client, a real-time sense data request to the SAS driver in response to receiving the SCSI status code indicating that the IO operation was unsuccessful.

4. The method of claim 1 wherein the client is constructed and arranged to buffer an IO context for the SCSI command when the SCSI command is conveyed from the client to the SAS driver to initiate the IO operation; and
    wherein providing the query communication from the client to the driver includes:
        sending, by the client, matching criteria to the SAS driver, the matching criteria including at least a portion of the IO context for the SCSI command.

5. The method of claim 4 wherein sending the matching criteria to the SAS driver includes:

sending, by the client, a set of timestamps and a storage device identifier that uniquely identifies the storage device among the plurality of storage devices to the SAS driver.

6. The method of claim 1 wherein the driver is constructed and arranged to maintain a database of entries which store sense data for respective IO operations performed by a plurality of storage devices supported by the driver; and
wherein providing the sense data corresponding to the IO operation includes:
based on the query communication, identifying a set of entries that corresponds to the IO operation, and
providing sense data from the identified set of entries that corresponds to the IO operation to the client.

7. The method of claim 6 wherein the database of entries resides within a ring buffer; and
wherein the method further comprises:
in response to the respective IO operations performed by the plurality of storage devices supported by the driver, overwriting older entries within the ring buffer and updating the database of entries to support binary searching.

8. The method of claim 7 wherein identifying the set of entries that corresponds to the IO operation includes:
applying a binary search algorithm to the database of entries to identify the set of entries based on a time range from the query communication.

9. The method of claim 1 wherein the driver is constructed and arranged to provide a sense data service to the client, the sense data service being in accordance with either (i) an event notification mode in which the driver sends event notifications to the client and does not respond to client query requests from the client and (ii) a query mode in which the driver responds to client query requests from the client and does not send event notifications to the client; and
wherein the method further comprises:
registering the client with the driver such that the driver operates in one of the event notification mode and the query mode.

10. The method of claim 9 wherein registering the client with the driver includes:
prior to providing the IO status communication from the driver to the client, performing a registration operation at the driver in response to a registration command from the client, the registration operation configuring the driver to operate in the query mode rather than the event notification mode.

11. The method of claim 9, further comprising:
after providing the sense data corresponding to the IO operation from the driver to the client, performing a re-registration operation at the driver in response to a re-registration command from the client, the re-registration operation re-configuring the driver to operate in the event notification mode rather than the query mode.

12. Electronic circuitry, comprising:
memory; and
control circuitry coupled to the memory, the memory storing instructions which, when carried out by the control circuitry, cause the control circuitry to perform a method of:
providing an input/output (IO) status communication from a driver to a client, the IO status communication indicating status of an IO operation performed by a storage device coupled with the driver,
in response to the IO status communication indicating that an error occurred while the storage device performed the IO operation, providing a query communication from the client to the driver, the query communication requesting sense data corresponding to the IO operation, and
in response to the query communication, providing the sense data corresponding to the IO operation from the driver to the client;
wherein the IO status communication is a Small Computer System Interface (SCSI) response;
wherein the driver is a Serial Attached SCSI (SAS) driver that supports operation of a plurality of storage devices; and
wherein the method further comprises:
prior to providing the IO status communication from the driver to the client, conveying a SCSI command from the client to the SAS driver to initiate the IO operation.

13. The electronic circuitry of claim 12 wherein the driver is constructed and arranged to maintain a database of entries which store sense data for respective IO operations performed by a plurality of storage devices supported by the driver; and
wherein providing the sense data corresponding to the IO operation includes:
based on the query communication, identifying a set of entries that corresponds to the IO operation, and
providing sense data from the identified set of entries that corresponds to the IO operation to the client.

14. The electronic circuitry of claim 12 [15] wherein the driver is constructed and arranged to provide a sense data service to the client, the sense data service being in accordance with either (i) an event notification mode in which the driver sends event notifications to the client and does not respond to client query requests from the client and (ii) a query mode in which the driver responds to client query requests from the client and does not send event notifications to the client; and
wherein the method further comprises:
registering the client with the driver such that the driver operates in one of the event notification mode and the query mode.

15. The electronic circuitry of claim 12 wherein the client is constructed and arranged to (i) refrain from sending query communications to the SAS driver in response to SCSI responses indicating successful IO operations and (ii) send query communications to the SAS driver in response to SCSI responses indicating unsuccessful IO operations; and
wherein providing the IO status communication from the driver to the client includes:
receiving, by the client, a SCSI status code indicating that the IO operation was unsuccessful.

16. The electronic circuitry of claim 12 wherein the client is constructed and arranged to buffer an IO context for the SCSI command when the SCSI command is conveyed from the client to the SAS driver to initiate the IO operation; and
wherein providing the query communication from the client to the driver includes:
sending, by the client, matching criteria to the SAS driver, the matching criteria including at least a portion of the IO context for the SCSI command.

17. The electronic circuitry of claim 16 wherein sending the matching criteria to the SAS driver includes:
sending, by the client, a set of timestamps and a storage device identifier that uniquely identifies the storage device among the plurality of storage devices to the SAS driver.

18. A computer program product having a non-transitory computer readable medium which stores a set of instructions to handle a storage device error; the set of instructions, when carried out by computerized circuitry, causing the computerized circuitry to perform a method of:

providing an input/output (IO) status communication from a driver to a client, the IO status communication indicating status of an IO operation performed by a storage device coupled with the driver;

in response to the IO status communication indicating that an error occurred while the storage device performed the IO operation, providing a query communication from the client to the driver, the query communication requesting sense data corresponding to the IO operation; and in response to the query communication, providing the sense data corresponding to the IO operation from the driver to the client;

wherein the IO status communication is a Small Computer System Interface (SCSI) response;

wherein the driver is a Serial Attached SCSI (SAS) driver that supports operation of a plurality of storage devices; and wherein the method further comprises:

prior to providing the IO status communication from the driver to the client, conveying a SCSI command from the client to the SAS driver to initiate the IO operation.

19. The computer program product of claim 17 wherein the driver is constructed and arranged to maintain a database of entries which store sense data for respective IO operations performed by a plurality of storage devices supported by the driver; and wherein providing the sense data corresponding to the IO operation includes:

based on the query communication, identifying a set of entries that corresponds to the IO operation, and providing sense data from the identified set of entries that corresponds to the IO operation to the client.

20. The computer program product of claim 18 wherein the driver is constructed and arranged to provide a sense data service to the client, the sense data service being in accordance with either (i) an event notification mode in which the driver sends event notifications to the client and does not respond to client query requests from the client and (ii) a query mode in which the driver responds to client query requests from the client and does not send event notifications to the client; and wherein the method further comprises:

registering the client with the driver such that the driver operates in one of the event notification mode and the query mode.

\* \* \* \* \*

UNITED STATES PATENT AND TRADEMARK OFFICE
CERTIFICATE OF CORRECTION

| | | |
|---|---|---|
| PATENT NO. | : 12,032,437 B2 | Page 1 of 1 |
| APPLICATION NO. | : 17/858575 | |
| DATED | : July 9, 2024 | |
| INVENTOR(S) | : Mike Xizhan Song and Wayne E. Garrett, Jr. | |

It is certified that error appears in the above-identified patent and that said Letters Patent is hereby corrected as shown below:

In the Claims

Claim 14, Column 18, Line 28, reads "12 [15]" should read --12--.

Signed and Sealed this
Twentieth Day of August, 2024

Katherine Kelly Vidal
*Director of the United States Patent and Trademark Office*